United States Patent
Buss et al.

[11] Patent Number: 5,841,958
[45] Date of Patent: Nov. 24, 1998

[54] BIPARTITE MATCHING

[75] Inventors: Samuel R. Buss, San Diego, Calif.; Peter N. Yianilos, Princeton, N.J.

[73] Assignees: NEC Research Institute, Inc., Princeton, N.J.; The Regents of the University of California, Oakland, Calif.

[21] Appl. No.: 377,319

[22] Filed: Jan. 19, 1995

[51] Int. Cl.[6] .................................................. G06T 11/00
[52] U.S. Cl. ................................................... 395/140
[58] Field of Search ...................... 395/140, 147, 395/155–161, 326, 335, 348, 349, 352, 353, 355–357

[56] References Cited

U.S. PATENT DOCUMENTS 5,481,668 1/1996 Marcus ................................. 395/155 X

*Primary Examiner*—Almis R. Jankus
*Attorney, Agent, or Firm*—Philip J. Feig; Arthur J. Torsiglieri

[57] ABSTRACT

A computer technique for bipartite matching of objects of one subset with objects of a different subset where multiple choices are permitted. A bipartite graph is formed in which the objects form nodes and the edges connecting pairs of nodes represent costs of matching the nodes connected. The original tour or graph is decomposed into a plurality of quasi-convex subtours or subgraphs and the minimum cost match of each subtour is found and the union of all such matches of the subtours is used as the desired match.

4 Claims, 9 Drawing Sheets

BIPARTITE MATCHING

FIELD OF THE INVENTION

This invention relates to a computer technique potentially applicable to any problem that is amenable to being represented in a graph that has properties such that bipartite matching of nodes of the graph provides a solution to the problem and to a computer for carrying out the technique. Typical of such problems are bipartite matching in which objects of one subset of a set are to be paired with objects of a different subset of the set in situations where there are multiple choices.

BACKGROUND OF THE INVENTION

A tool for matching objects that has become of increasing importance as computers have become more available and powerful is graph theory. In graph theory: the objects become nodes, nodes of one color representing objects of one subset, and nodes of another color representing objects of the other subset; the total collection of nodes to be matched becomes a bipartite graph; and a pairing of two nodes of different colors representing objects between which some matching relationship is to be established becomes an edge of the graph. Generally, there is a well-defined cost function associated with every possible pairing of the nodes to be paired and the problem to be solved is that of efficiently finding the bipartite matching desired that has a minimum or near minimum total cost where the total cost is the sum of the individual edge costs of the bipartite matching.

Among possible applications of bipartite graphs for matching has been matching a particular spelling of a given word included in a given set of words for testing the correctness of the particular spelling. String comparisons, such as is involved in word matching, can be reduced to a quasi-convex matching problem by considering each alphabetic symbol in turn (replacing all other symbols with blanks) and then embedding each such subproblem in a linear graph. The symbols of one word or string can be represented as red nodes of one subset and the symbols of the other word or string as blue nodes of the other subset and one takes as the cost function a concave-down function $f$ of the displacement $\chi$ along the line, for example where $f(\chi)$ varies as the square root of $\chi$, which meets the weak analyticity condition to be described later. Other matching problems including matching a particular image with the images in a given set of images to ascertain any relationships between the particular image and one of the given set of images. A problem that is currently of growing interest is that of finding a match between a given fragment of an unidentified DNA molecule and the DNA molecule of which it is most likely a part from a list of known DNA molecules. Other applications include database field searches (e.g. looking up a name or address) and the analysis of multi-field records, such as mailing addresses, to eliminate near duplicates.

Other applications will be to locate and extract records that are very similar to a supplied query, even when the query is inexact.

Simple probability theory indicates that the total cost of evaluating every possible bipartite matching, when measured in terms of the run-time on a computer, is proportional to N factorial where N is the number of nodes. In fact, it can be shown that the problem can generally be solved more efficiently with a run-time no greater than one proportional to $N^3$ by an appropriate algorithm.

Moreover, algorithms that are more efficient than one with run-time proportional to $N^3$ have been developed for various special cases. These typically focus on planar geometrical settings, such as matching red points with blue points, all located either on a straight line or on the perimeter of a circle, with the cost function defined to be equal to the Euclidean distance, or the minimum arclength, between the two points.

In a paper entitled "Fast matching algorithms for points on a polygon" SIAM J. Comput., 20 (1991) pp. 495–422, Marcotte et al have shown that for the case of equal numbers of red and black points forming the vertices of a convex polygon, where the cost function is equal to the Euclidean distance, the bipartite matching problem runs in the order of $N(\log N)$ time.

The present invention offers a process that is considerably more general than these planar geometrical settings and that in appropriate cases may be considerably more efficient, involving run times no greater than times of the order of $N(\log N)$ and in some instances as small as of the order of N, or linear time with respect to N. This difference can be very significant where N is large, as in the hundreds of thousands.

The invention is expected to be useful, for example, in improving the speed of the string comparator system and method described in our earlier U.S. Pat. No. 4,490,811 that issued on Dec. 25, 1984, and its teaching is incorporated herein by reference.

SUMMARY OF THE INVENTION

In one aspect, the invention involves a process that utilizes a matching algorithm that is applicable in special cases. In another aspect, the invention is a computer that has been adapted to run the matching algorithm. The requisite conditions for its use are basically as follows:

1. The nodes of the graph must be given as a quasi-convex tour, where a quasi-convex tour is one in which an ordering of N nodes $X_1, X_2, \ldots, X_N$ is one which wraps around so that node $X_N$ is followed by node $X_1$ and where the following inequality holds for any four nodes $X_i$, $X_j$, $X_k$ and $X_l$ that are in tour order though not necessarily consecutive, $C(X_i, X_l)+C(X_j, X_k) \leq C(X_i, X_k)+C(X_j, X_l)$ where $C(X,Y)$ denotes the cost of pairing nodes X and Y.

2. The graph must be either balanced (equal numbers of red and blue nodes, the nodes being matched) or line-like, and for any node the cost to pair it with a node of different color always increases with increasing separation along the tour in either direction.

When these two conditions are met, the algorithm finds a minimum-cost matching in at most the order of $N(\log N)$ time. Moreover, if the cost function meets an additional condition of "weak analyticity", the time may be reduced to as little as the order of N time. Weak analyticity is typically satisfied when the cost function can be defined as a definite analytical expression.

The algorithm in its abstract form includes a series of basic steps. Given a quasi-convex tour or graph of nodes to be matched, the first step is the reduction of that original tour to a set of quasi-convex subtours in which the nodes alternate in color and every node is matched with a node at the same level. It can be proved that a minimum-cost matching for the whole tour can be obtained as a union of the minimum cost matchings for these alternating color subtours. In the case of a balanced main tour, the nodes divide evenly into alternating color subtours. In the case of an unbalanced tour, there will be at least one unbalanced subtour. In this case, a temporary new node of appropriate color is added to any such subtour for balance and the cost to match with this new node is defined to be zero for all nodes in the subtour. At the end of the algorithm, the node that matched with the new node is declared an unmatched node.

Additionally, a novel feature of the invention is the algorithm then used for determining the minimum cost of the bipartite matching of different color nodes of each subtour. This algorithm is to be defined as the main algorithm.

The theory of this algorithm is fully developed in an article by S. R. Buss and P. N. Yianilos entitled "Linear and O(n log n) Time Minimum-Cost Matching Algorithms for Quasi-convex Tours" in the Proceedings of the Fifth Annual ACM-SIAM Symposium on Discrete Algorithms, Jan. 23, 1994, pp. 65–76, which is incorporated herein by reference, but a condensed version will be described below. But before such description, it will be helpful to define a few terms that will be used therein.

A greedy matching is a matching of every node to an adjacent node; in all other matchings, there are jumpers which are edges connecting two non-adjacent nodes in the tour. If X and Y are nodes, let [X,Y] be the sequence of nodes starting at X and ending at Y. A jumper from X to Y is called a candidate if it is preferable for a matching to have a jumper from X to Y with no other jumpers in [X,Y] than for it to have no jumpers at all in [X,Y]. A candidate is called minimal if there is no other candidate in [X,Y].

These relationships lead to the basic strategy behind the main algorithm which is as follows. Iteratively find a minimal candidate in a subtour, assign the edges that correspond to the greedy matching of nodes in the interior of the minimal candidate, discarding the nodes in the interior and recursively apply the same procedure to the remaining subtour. When no candidate remains, then greedy matching between neighboring nodes is used on the remaining unmatched nodes.

To implement the recursive step, which normally does not run in linear time or even near linear time, in near linear time, the main algorithm scans each subtour in circular order and maintains a list of nodes in a storage memory called the M deque, and the M deque contains all the nodes that have been scanned already but have not yet been matched. Also, the nodes in the M deque include the nodes which may be used as the left endpoint of minimal candidates. As each node X is scanned, it is scanned against the rightmost element Y of the M deque that is a possible left endpoint of a candidate. If a candidate is found the appropriate edges interior to the found candidate are greedily matched and removed from further consideration. Then while still scanning the same node X, a crossover condition is checked to determine if the nodes X and Y can be discarded from consideration as left endpoints of candidates in the future. If so, the X and/or Y nodes can be discarded from consideration, as appropriate, and in the latter case, the next rightmost potential candidate endpoint on the M deque is also so checked, recursively as necessary.

The invention will be better understood from the following more detailed description taken in conjunction with the accompanying drawing.

DETAILED DESCRIPTION OF THE INVENTION

There will first be described apparatus for the practice of the invention with limited explanation of the theoretical bases and software that underlie it. These are set forth in an article by S. R. Buss and P. N. Yianilos entitled "Linear and O (n log n) Time Minimum-Cost Matching Algorithms for Quasi-convex Tours" in the Proceeding of the Fifth Annual ACM-SIAM Symposium on Discrete Algorithms, Jan. 23, 1994, pp. 65–76 and in the software in the appendix hereto.

Typically, the invention will be practiced by a general purpose computer that has been suitably programmed by disks or other memory devices on which the appropriate application program has been stored to effect the desired bipartite matching. Alternatively, a special purpose computer may be designed to carry out the bipartite matching once supplied with the appropriate inputs.

In either case, usually it is first important to prepare the one or more graphs that suitably describe the problem to be solved. Generally the graphs may be either closed to form a circle or linear.

It is convenient generally to prepare the graph so that the nodes of one of the subsets to be matched are depicted as dots of one type and the nodes of the other subset as dots of a different color 12. In the completed graph 10 of FIG. 4, the different colors of the nodes are depicted either by hollow circles 11 or by solid circles, 12. The position of the various nodes should reflect the cost function in the manner characteristic of such graphs. Generally, the cost of a particular match between two nodes of different colors is related to the separation of the two nodes, typically either the length of the arc or the length of the chord between the two nodes, and the cost function advantageously should be related to some function f(X) where X is the relevant separation of the nodes in the graph.

Figure 1:
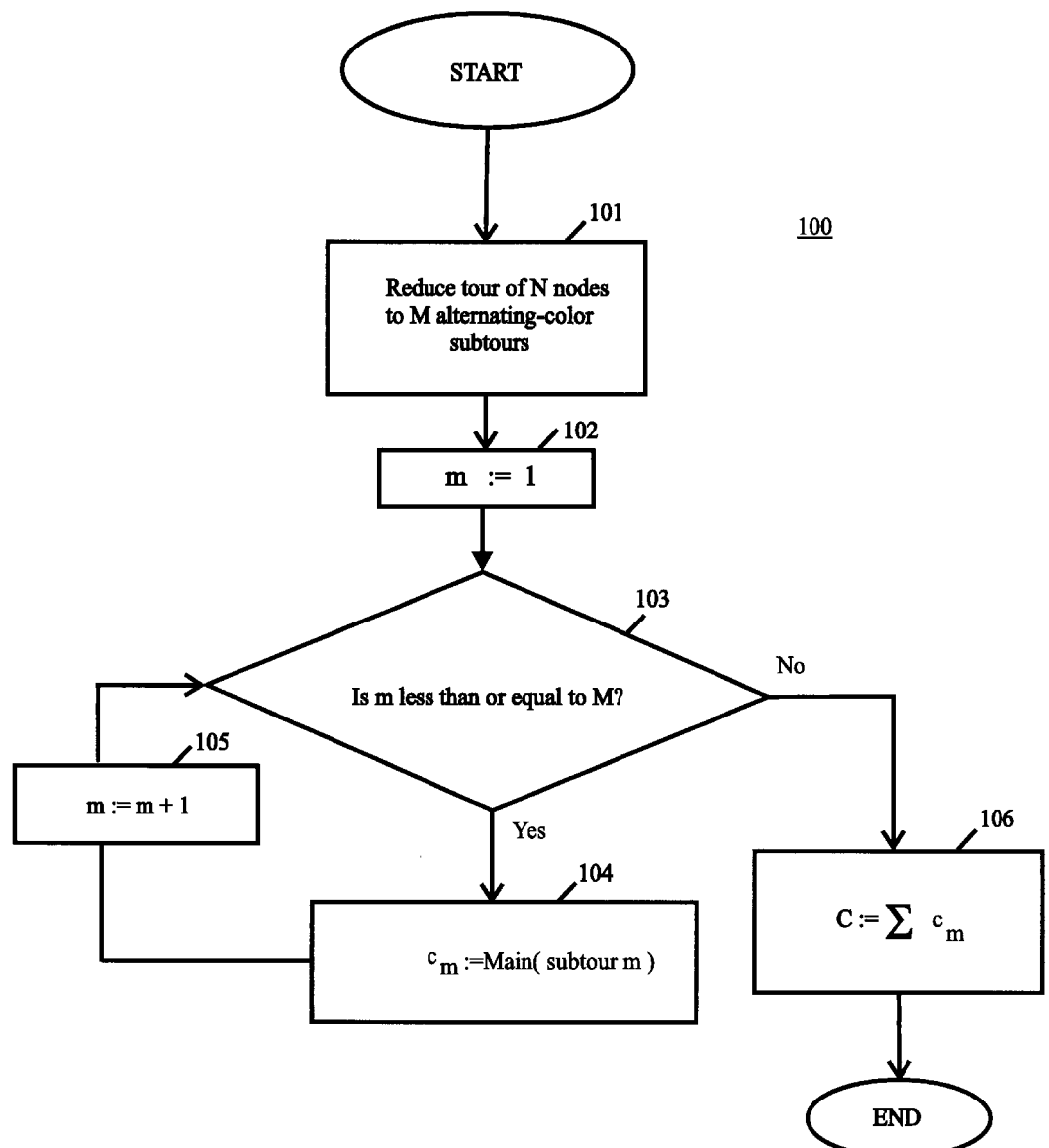
FIG. 1 may be viewed either as a flow chart of the basic steps of the process practiced by the invention or a block diagram of the means that form a special purpose computer in accordance with the invention.

After the graph information has been appropriately stored as inputs in the appropriate memory of the computer in the manner usual for such storage, the computer processes the information stored in the manner depicted in FIG. 1, which is a flow chart 100 of the basic steps of the algorithm.

Figure 4:
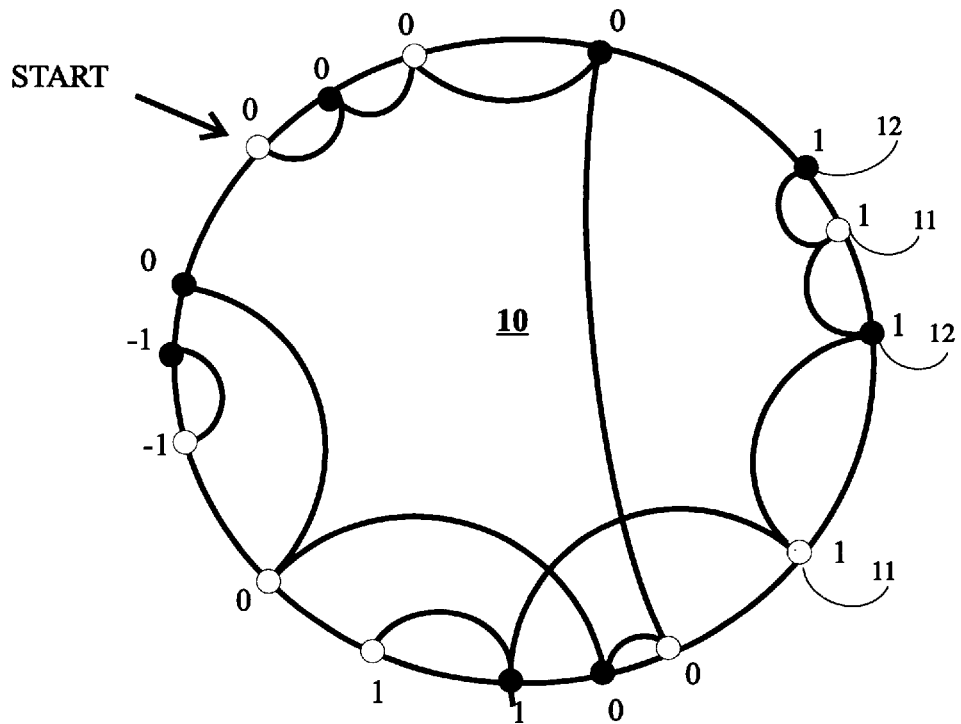
FIG. 4 is a typical graph illustrating the resolution of a bipartite matching tour into a plurality of bipartite quasi-convex tours that forms one feature of the process practiced by the invention.

The practice of the typical embodiment of the invention begins, as represented by block 101, by decomposing or reducing the original bipartite tour or graph of N nodes into a set of interleaved quasi-convex subtours in which the successive nodes alternate in color as shown in FIG. 4.

Figure 2:
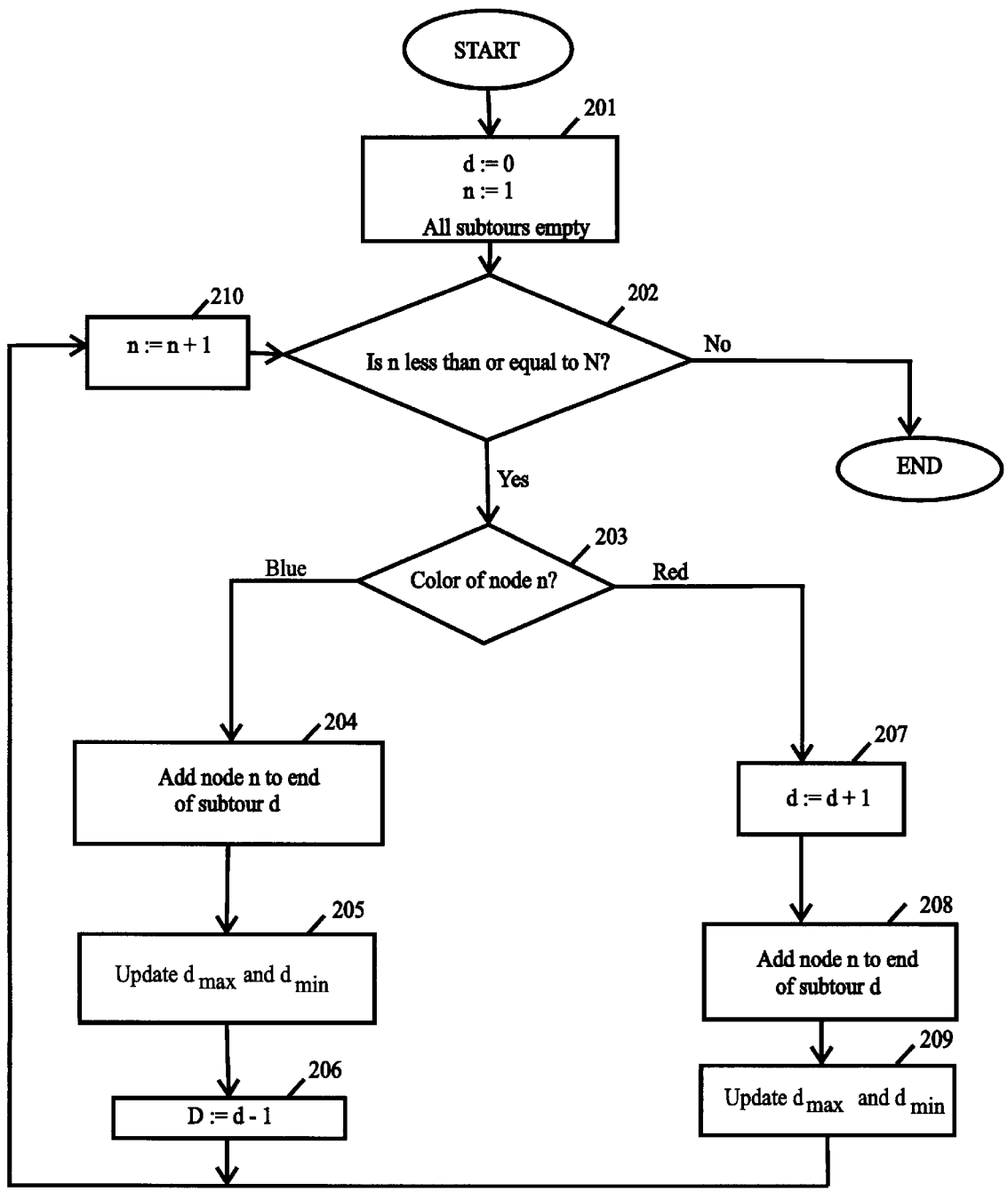
FIGS. 2 and 3 are flow charts showing more detail in steps of the flow chart of FIG. 1.

This is possible since there must be an optimal matching with no crossing edges, and, in such matching, every node is matched with a node at the same level. The level of the nodes can be computed by a simple counting process, analogous to the problem of finding matching parentheses in a well-formed mathematical expression. The particular decomposition method used is one designed to ensure that a union of the minimum-cost matchings for these alternating color subtours will be a minimum-cost matchings for these alternating color subtours will be a minimum-cost matching for the whole tour. See Lemma 3 in the Buss et al article supra which reads that if one lets G be either a linear quasi-convex tour or a balanced quasi-convex tour, then G has a minimum-cost matching in which every edge $\chi_i \leftrightarrows \chi_j$ satisfies $\chi_i \sim \chi_j$. In other words, some minimum-cost matching for G can be obtained as a union of minimum-cost matchings on the~-equivalence classes of G. The decomposition typically will result in M alternating color subtours. The flow chart for this initial decomposition step is shown in FIG. 2 and will be discussed more fully later with reference to such flow chart.

Figure 3:
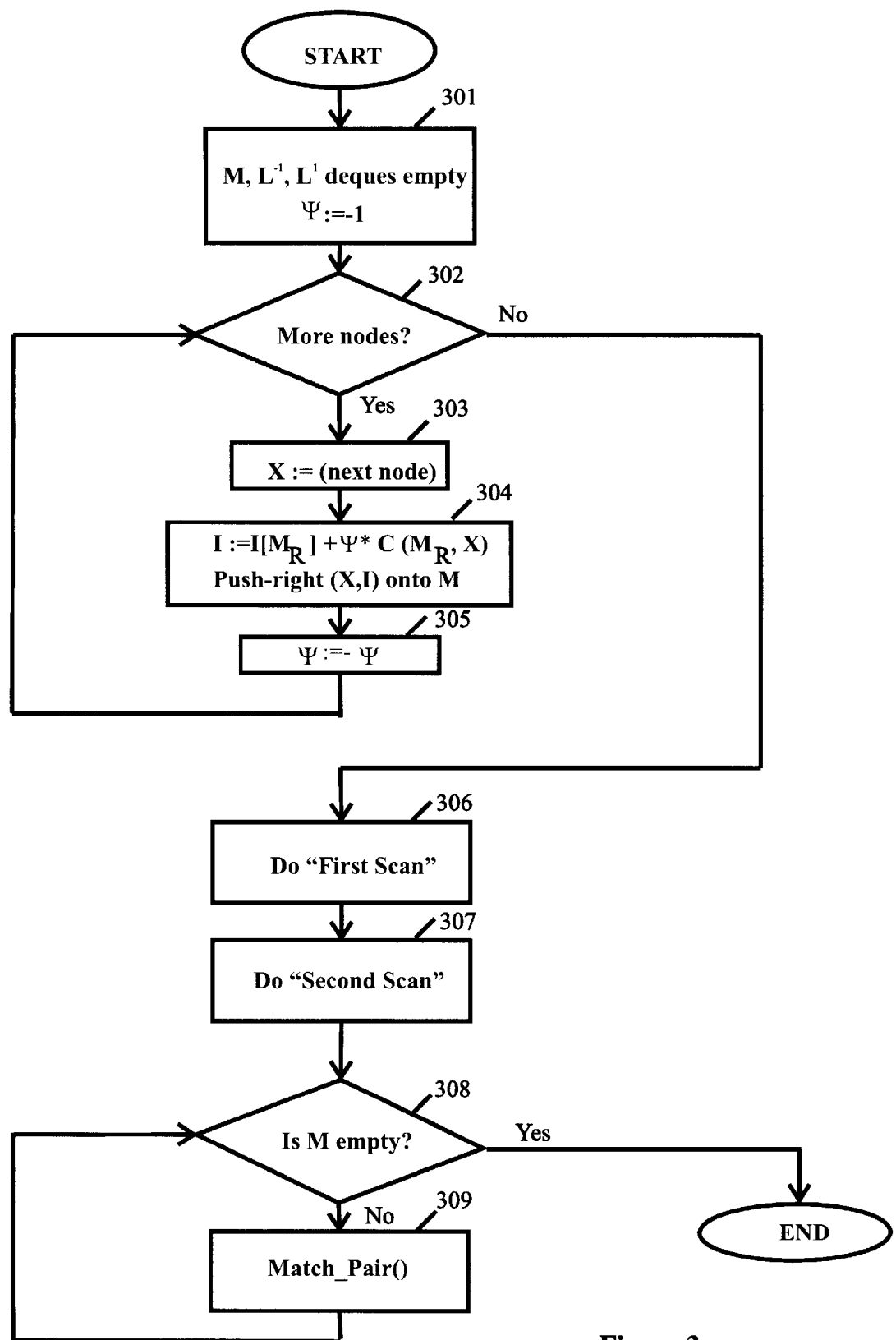

Then as indicated by block 102, there is initialized subtour counter m to 1, and as indicated by block 103, the program inquires whether m is less than or equal to M to ascertain whether there are additional subtours to process. Then as indicated by block 104, the main algorithm is run for the tour m. The flow chart of the main algorithm is depicted in FIG. 3 and will be described below. Basically, this step provides a cost c for each subtour plus a set of matched pairs of nodes.

Then as indicated by block 105, after each subtour has been so processed, m is incremented and steps 103 and 104 are repeated until the last subtour has been processed.

Then as indicated by block 106, when there are no more subtours to process, all the $c_m$'s are added together to provide the total cost for the tour of the N nodes, since the union of the set of matched pairs by the main algorithm for the M subtours is the matching for the whole tour.

With reference to FIG. 2, we will now expand on the process of block 101. We accumulate the subtours in linked lists indexed by the value of an integer variable "d" which will assume values in some continuous range between –N and +N inclusive where N is the length of the tour. It is thus sufficient to allocate an array of dimensions (2N+1) for the heads of the linked lists. Nodes in the list are specified by their ordinal position in the tour.

As indicated in block 201, we first initialize integer variable d to 0 and counter n to 1; and initialize the linked lists to be empty. As indicated by block 202, the program run begins by asking whether n is less than or equal to N. So long as it is we continue to the step of block 203. Here we branch on the color (subset) to which the node n belongs. If n is a blue node, we add the blue node to the end of the linked list d as indicated by block 204 and then as indicated by block 205, d is compared to the maximum and minimum values for d achieved up to this point, and update these values if required. Then we can decrement d as shown in block 206. Alternatively, if the color of node n was red, we increment d per block 207 and then add the red node to the end of linked list d. We then compare d with the maximum and minimum values of d derived so far per block 208, and update these values if called for, as per block 209. Now we can increment n per block 210 and return to step 202 for further processing if n is still less than N.

In FIG. 4, there is shown for purposes of illustration a limited graph of 16 nodes, eight red, indicated by empty circles 11, and eight blue, indicated by cross-hatched circles 12, and the three sub-tours corresponding to d values of +1, 0 and −1, that are formed by the algorithm 101, where the various subtours are formed by inter-connecting the various nodes as indicated by the values shown for each node.

We will now proceed to a more detailed description of the main algorithm 104 detailed in FIG. 3 which is responsible for determining for each of the subtours the minimum-cost routing between the nodes that are included in each individual subtour.

For the main algorithm the central data structures for the routing of individual subtours are three deques (double-ended queues) called M, the main deque, $L^1$ and $L^{-1}$ (the two left deques). A deque is a list of elements which may be added to or subtracted from at each end. If viewed as in a horizontal orientation, each deque has a left and a right end. The following operations are implemented for updating deques: push-right, which adds a node to the right end of a deque; pop-right, which pops the rightmost node off the right end of a deque; and pop-left, which pops the leftmost node off the left end of a deque.

Deque operations are efficiently implemented by using contiguous memory locations to store the deque elements and maintaining pointers to the left and right endpoints; each deque operations can then be operated in unit time. For our algorithm it will suffice to reserve enough space for 2N elements (with no possibility that a deque will grow leftword) since push-lefts are unnecessary in this preferred implementation.

Subscripts R, L and R−1 are used to select the rightmost element, leftmost element, and the element preceding the rightmost, respectively. Accordingly, $L_L^{-1}$ refer to the leftmost element of $L^{-1}$; $M_{R-1}$ refers to the element just before the rightmost member of M, etc.

In general, we will use the value of the integer program variable ψ (or its negative −ψ) to select an L deque. ψ can assume the values ±1. So, if ψ=−1, $L^\psi \Leftrightarrow L^{-1}$ and $L^{-\psi} \Leftrightarrow L^1$ if ψ=+1, $L^\psi \Leftrightarrow L^1$ and $L^{-\psi} \Leftrightarrow -L^1$.

Each deque element is actually a pair, for example M(R)= (X,I); the first entry X of the pair is a node and the second entry is a numerical value associated with node X. To simplify the notation, we shall use the same notation for a deque element as for the node which is the first component. Thus M(L) also denotes the node which is its first component. We then use I[M[L]] to denote the second component, its numerical value. Similar conventions apply to $L^1$ and $L^{-1}$ deques.

With reference now to FIG. 3, we begin by initializing all deques to be empty and ψ to be equal to −1, as indicated by block 301.

Next, as indicated by blocks 302 and 303, we read in the next node, if any, of the selected alternating color subtour being matched, the various subtours to be selected in turn, into variable X. If there are no more nodes to read in, we go to step 306, the first scan, to be described in more detail in connection with FIG. 4.

If there was a node X to read in, we calculate the "I value" for node X based on the current rightmost node of the M deque and then push node X onto the right end of the M deque, as indicated in block 304, I:=I($M_R$+ψC($M_R$X).

The value of ψ is inverted, as indicated in block 305, and we return to step 302 to repeat the process for the next node of the alternating subtour so long as there is another node.

Figure 5:
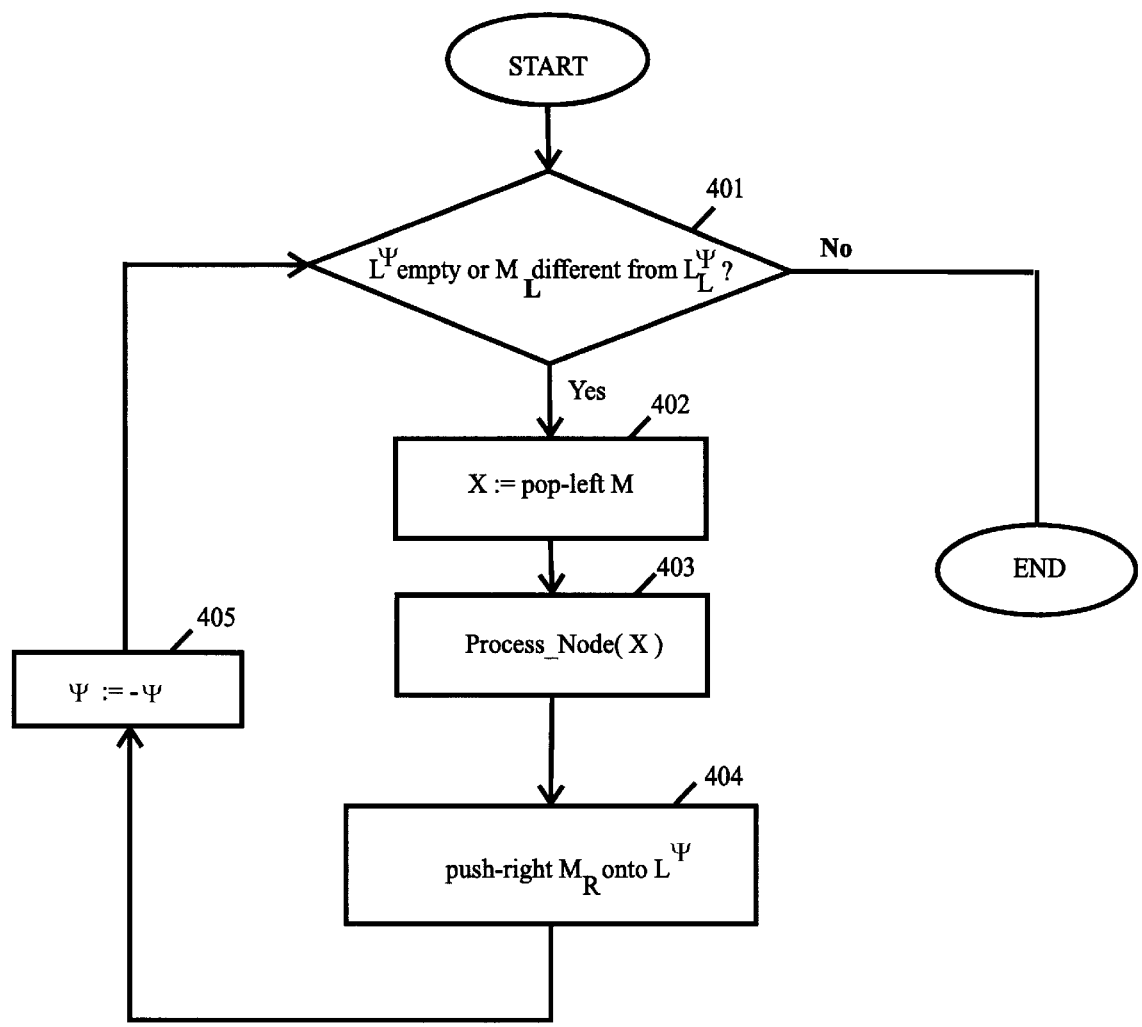
FIGS. 5 and 6 are flow charts showing more detail in steps of the flow chart of FIG. 3.

When there are no longer any nodes we proceed in turn to the previously mentioned "First Scan" step (306) and the "Second Scan" step (307) which in detailed in FIG. 5.

At the end of the second scan, we check to see if the M deque is empty (308). If it is not, we execute the procedure "Match Pair" (309) to pop off a matched pair of nodes from the M deque and then return to step 308 until the M deque is empty.

During the scans mentioned above, nodes are popped off the left end of the M deque and then pushed onto its right end. In addition, while processing a node, some nodes may be popped off the right end of M to be matched.

It will generally be the case that the M deque contains a sequence of contiguous nodes of the subtour being matched in tour order and that the node currently being scanned immediately follows the formerly rightmost element of the M deque. The sign of $\psi$ is maintained to be appropriate for the color of this current node.

The procedure 306 for First Scan is illustrated in the flow chart of FIG. 5. As indicated by block 401, we begin by checking whether the $L^\psi$ deque is either (A) empty or (B) its leftmost node does not correspond to the leftmost node of the M deque. If this condition is fault, we exit. If either of these conditions is met, we continue to step 402 and pop the leftmost node off of the M deque into the variable X and then execute the procedure Process Node 403 on node X. The flow chart of Process Node is set forth in FIG. 6, and we then push a copy of the rightmost node of the M deque onto the right end of the $L^\psi$ deque as indicated by block 404. Thereafter as indicated by block 405, the sign of $\psi$ is inverted and we return to step 401.

Figure 6:
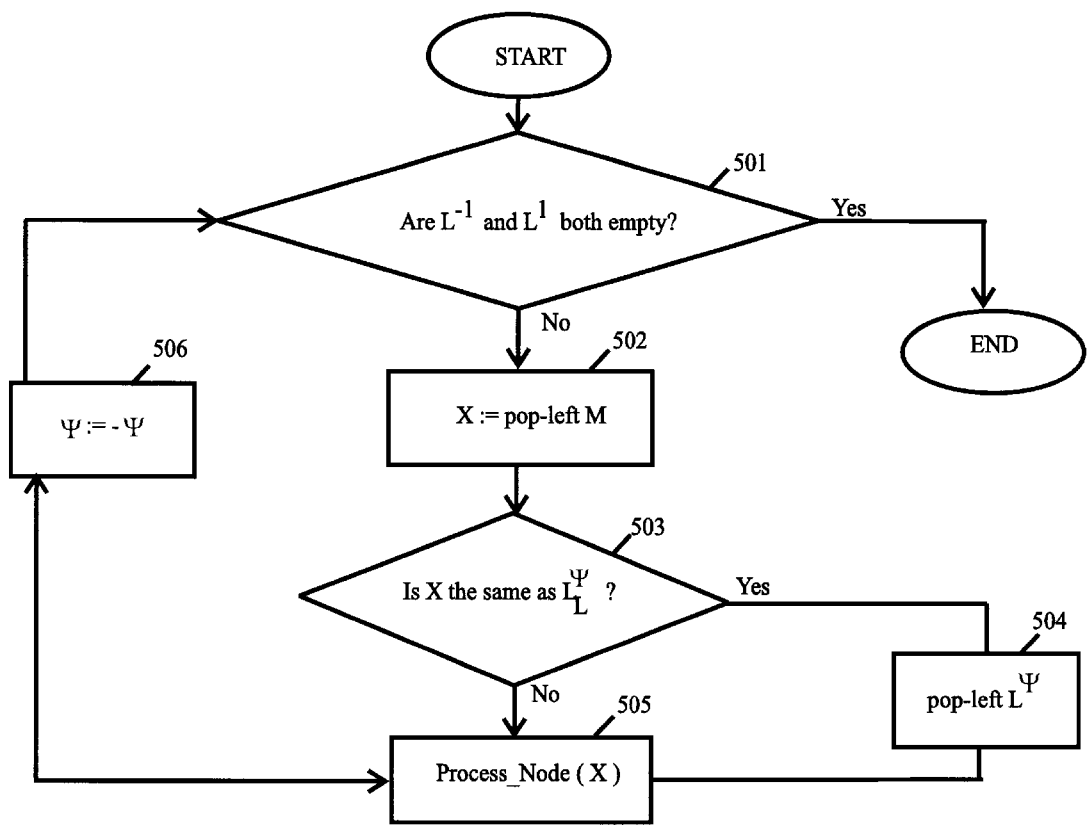

The flow chart of the procedure Second Scan 307 is shown in FIG. 6. It begins by checking whether deques $L^\psi$ and $L^{-\psi}$ are both empty as shown by block 501. If the answer is yes, we exit. If the answer is no, we pop the leftmost node off the M deque into the variable X, as indicated by block 502 and then as step 503 check to see whether X corresponds to the leftmost node of the $L^\psi$ deque. If it does, we proceed to step 504 which involves popping the leftmost node off the $L^\psi$ deque and thereafter continue to step 505 which involves the procedure Process Node 505. If it does not, we proceed directly to procedure Process Node 505 on node X. Thereafter as step 506 we invert the sign of $\psi$ and return to step 501 to repeat the scan until both $L^\psi$ and $L^{-\psi}$ deques are empty.

Figure 7:
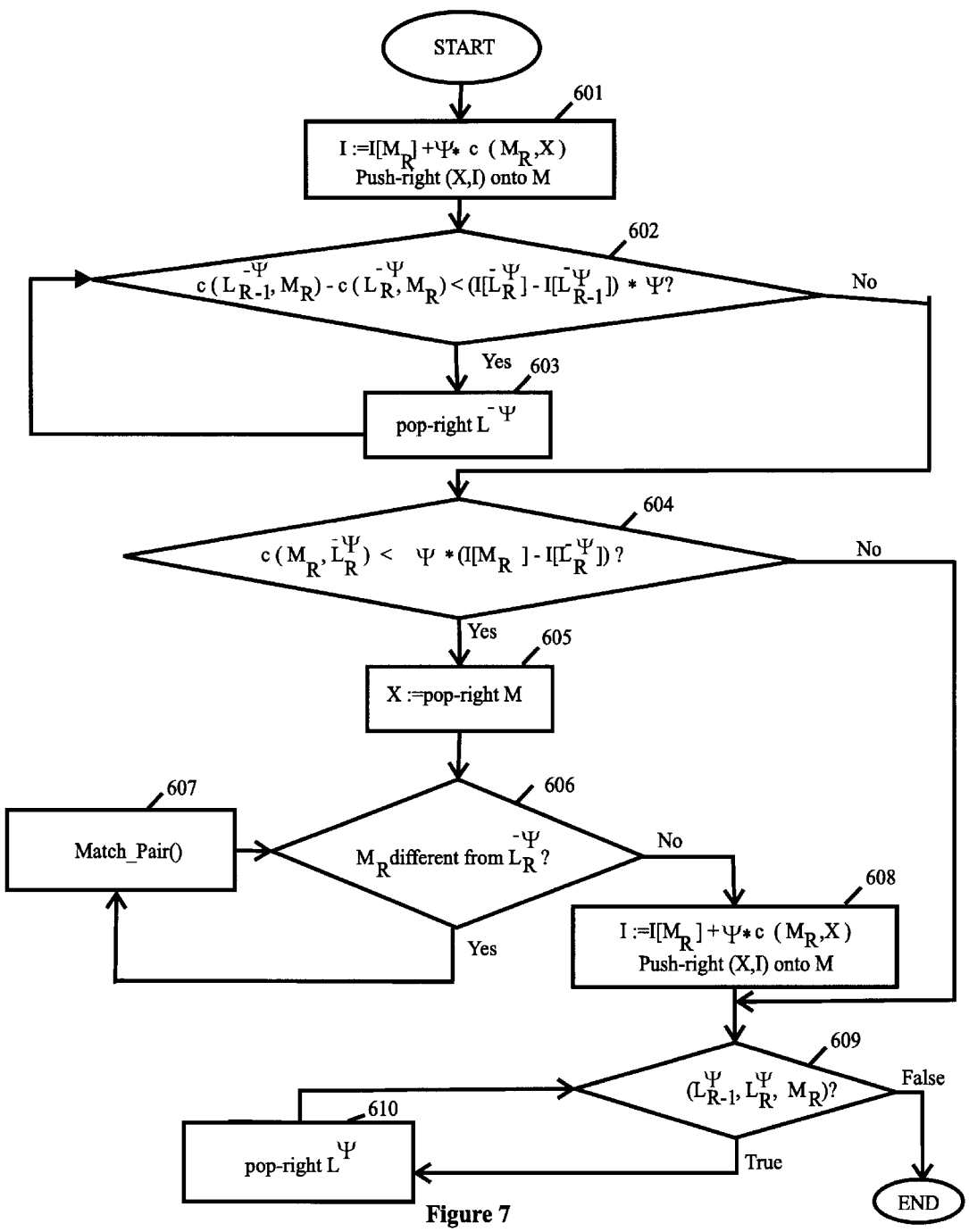
FIG. 7 is a flow chart showing more detail of a step that is included in the flow charts of each of FIGS. 5 and 6.

FIG. 7 is a flow diagram of the Process Node procedure shown as steps 403 and 505 in the First Scan and Second Scan subroutines.

This procedure begins as step 601 with the calculations of the I value for node X based on the current rightmost node of the M deque and we then push node X onto the right end of the M deque. Then as step 602, we check to see if the following inequality is true:

$C(L_{R-1}^{-\psi}, M_R) - C(L^{-\psi}M_R)$ is less than $(I[L_R^{-\psi}] - I[L_{R-1}^{-\psi}]) \cdot \psi$.

If the inequality is true, we continue to step 603, and pop rightmost node off the deque $L^{-\psi}$ and return to step 602.

If the inequality is false we proceed to step 604, which involves testing the inequality $C(M_R L_R^{-\psi})$ is less than $\psi \cdot [I(M_R) - I(L_R^{-\psi})]$. If this inequality is satisfied, we proceed to step 605 and pop the rightmost node off of the M deque into variable X. If unsatisfied, we proceed to step 609. When the inequality of step 604 is true, we have identified ($L_R M_R$) as a minimal candidate.

After step 605, we proceed to step 606 and check to see if the rightmost node of the M deque corresponds to rightmost node of the $L^{-\psi}$ deque. If it does, we proceed to step 607. If it does not, we continue to step 608.

Step 607 is the procedure Match Pair to pop off a matched pair from the M deque and return to step 606.

Step 608 involves the calculation of the I value for node X based on the current rightmost node of the M deque and the pushing of node X onto the right end of the M deque. We then proceed to step 609.

Figure 9:
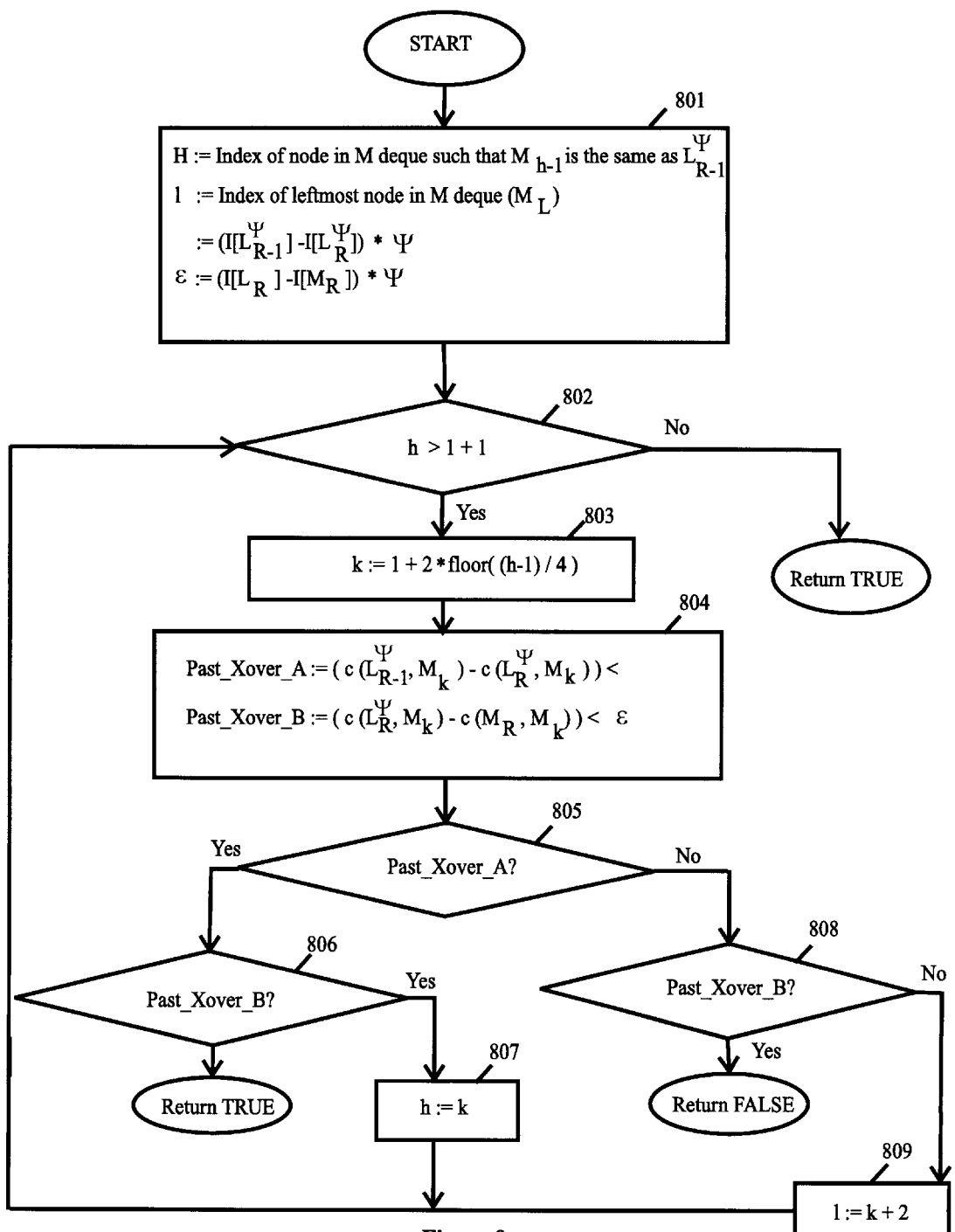
FIG. 9 is a flow chart of the $\Omega$ predicate that is included in the flow chart of FIG. 7.

Step 609 involves the evaluation of the omega predicate with node arguments $L_{R-1}^\psi$, $L_R^\psi$ and $M_R$. If the predicate is true, we continue to step 610. Otherwise we exit. Omega ($\Omega$), discussed more fully in connection with FIG. 9, is a predicate involved in the crossover test 609 that determines which of the two potential left endpoints of a candidate can be discarded from further consideration as left endpoints of candidates. It largely determines the run time of the run time analysis of the main algorithm. Its run time is never greater than the logarithm of the number of nodes, so the main algorithm's run time is never worse than n log n, but in some instances its run time can be computed in constant time, in which case the run time of the main algorithm is linear to the number of nodes in the graph.

The crossover condition is essentially the following. Suppose the M deque contains nodes X and Y which are two potential left endpoints of candidates. It is shown in Appendix A that there is a crossover point V such that for nodes after node Y and before node V, for selecting between nodes X and Y it is better to check whether the edge from node Y to node V is a candidate and that for nodes from node V to node Y it is better to check whether the edge from node Y to node V is a candidate. In step 609, $L^{\psi R-1}$ and $L^{\psi R}$ play the roles of X and Y and we check whether $M_R$ is past the crossover point V.

As step 610, we pop the rightmost node off the M deque and return to step 609.

Figure 8:
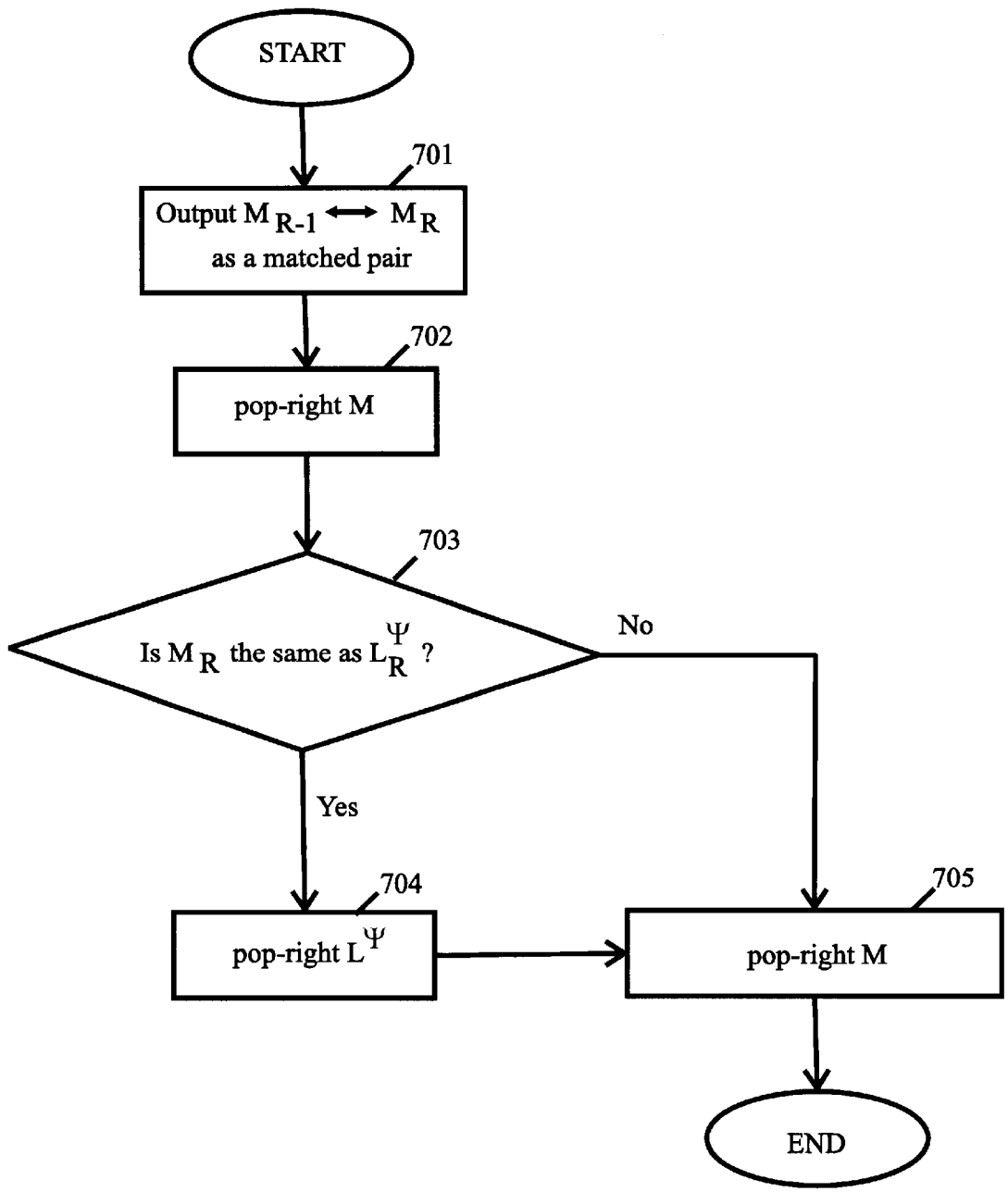
FIG. 8 is a flow chart showing more detail of a step of the flow charts of FIGS. 3 and 7.

FIG. 8 is a flow chart of the procedure Match Pair that forms step 309 in the main algorithm and step 607 in the Process Node procedure. The procedure Match_Pair assigns a jumper $M_{R-1} \leftrightarrows M_{R-1}$ as a matched pair, as step 701. Then as step 702, the rightmost node is popped off the M deque. Then as step 703 it determines whether the rightmost node of the M deque corresponds to the rightmost node of the $L^\psi$ deque and if it does, we pop right the $L^\psi$ deque per step 704 and if it does not, we pop right the M deque.

FIG. 9 is the flow chart for the procedure for deriving the generic $\Omega$ that is involved in step 609. This procedure is a Boolean predicate that returns either a value of True or False. As indicated in block 801, it begins by initializing h to the index of the node in the M deque, such that the node before it, $M_{h-1}$ is $L_R^\psi$. It further initializes l to the index of the leftmost node in the M deque so that $M_1 = M_L$. It further initializes variable $\delta$ to the expression $I[L_R^\psi] - I[M_R]$ multiplied by the current value of $\psi$. It also initializes variable $\epsilon$ to the expression $I[L_R^\psi] - I[M_R]$ multiplied by the current value of $\psi$.

Then as step 802, there is determined whether h is greater than l+1 and if so we continue to step 803. If not, we exit returning an output of TRUE. If so, per step 803, we set a value to k which is defined as l+2 floor (h−1) divided by 4 where "floor" is the floor or greatest integer function, which returns the greatest integer less than or equal to its argument. As step 804, we set the Boolean variable Past_X over_A to the truth value of the expression $$(C[L_{R-1}^\psi, M_k]) - C(L_R^\psi, M_k) < \delta$$

and set the Boolean variable Past_X over B to the truth value of the expression $$C([L_R^\psi], M_k) - c(M_R, M_k) < \epsilon.$$

Then as step 805, if Past_X over A is true, we continue to step 806. If it is false, we continue to step 808.

Then as step 806, if Past_X over B is true, we continue to step 807; if it is false, we exit returning TRUE.

Then as step 807, we set h equal to k and return to step 802.

Then as step 808, if Past_X over B is true, we exit, outputting FALSE. If it is true, we continue to step 809.

As step 809, we set l equal to k+2 and return to step 802.

It is to be understood that the invention may be viewed either as a process for providing bipartite matching in the manner discussed or as apparatus that when provided with appropriate controls will function to provide the desired bipartite matching. Such apparatus may be either a general purpose computer appropriately programmed by means of its memories or a special purpose computer appropriately designed with circuitry to operate as described.

What is claimed is:

1. A process for performing bipartite matching of an object of a first subset with an object of a second subset comprising the steps of:

preparing a graph as a tour in which the objects of the first and second subsets form the nodes and the distance between an object of the first subset and an object of the second subset is the cost of the bipartite matching of such two objects, decomposing the tour to form an interleaved set of quasi-convex subtours in each of which the nodes alternate between the first and second subsets, whereby the decomposition is such that a union of the minimum cost match for this set of subtours will be a minimum cost-match of the tour, finding the minimum cost-match of each subtour, and combining all the minimum cost-matches to form the desired bipartite match of the objects to be matched.

2. A computer that includes a storage medium in which there is included a program for operating the computer in accordance with the process of claim 1 when the computer is supplied with the two subsets between which the desired bipartite matching is to be made.

3. A process in accordance with claim 1 in which the objects of the first subset and second subsets are strings of characters and the bipartite match will be a pair of matching strings of characters.

4. The process of claim 1 in which the step of finding the minimum cost match of each subtour comprises the steps of searching iteratively for jumpers that qualify as minimal candidates, matching nearest neighbor pairs included within minimal candidate pairs, and recursively applying the last-mentioned searching and matching steps to the remainder of the subtour until all the nodes are paired.

* * * * *